Nov. 10, 1953 R. K. E. WILÉN ET AL 2,658,445
ARRANGEMENT IN A SCREW PRESS FOR SQUEEZING OUT WATER
Filed Oct. 23, 1950 2 Sheets-Sheet 2
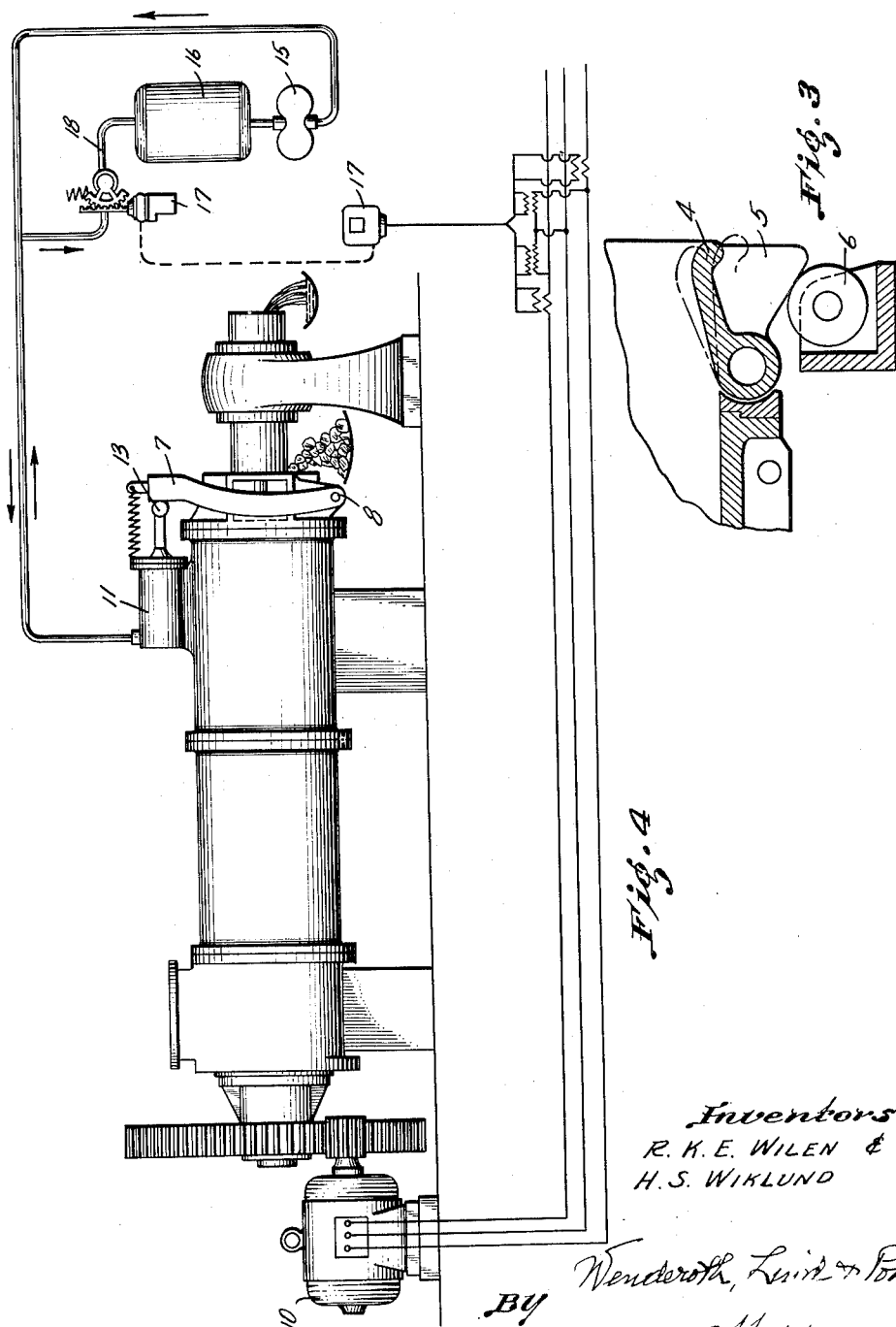
Inventors
R. K. E. WILEN &
H. S. WIKLUND

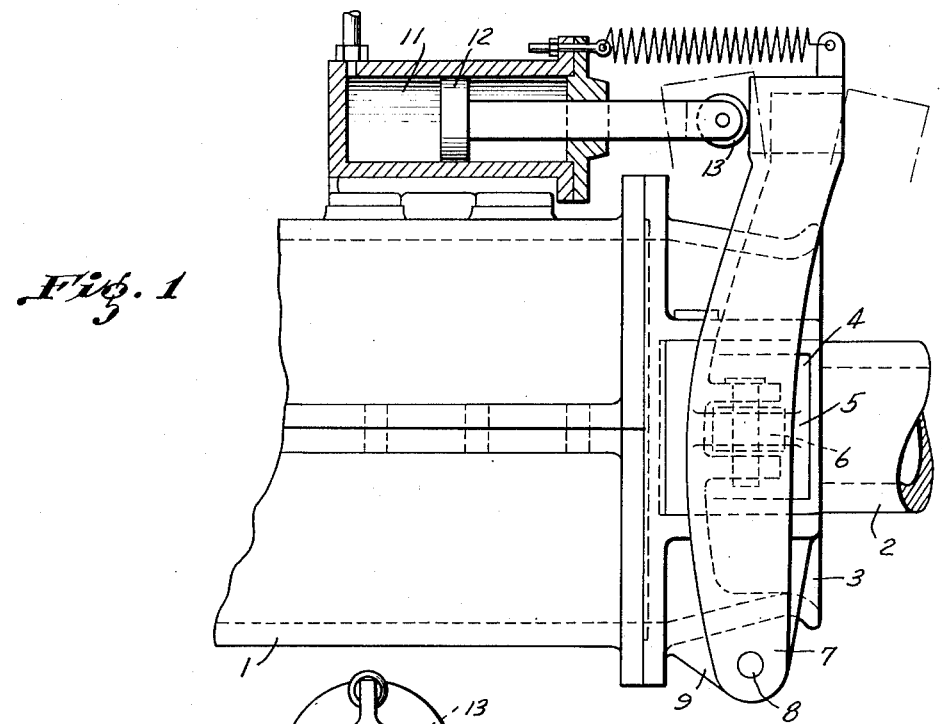
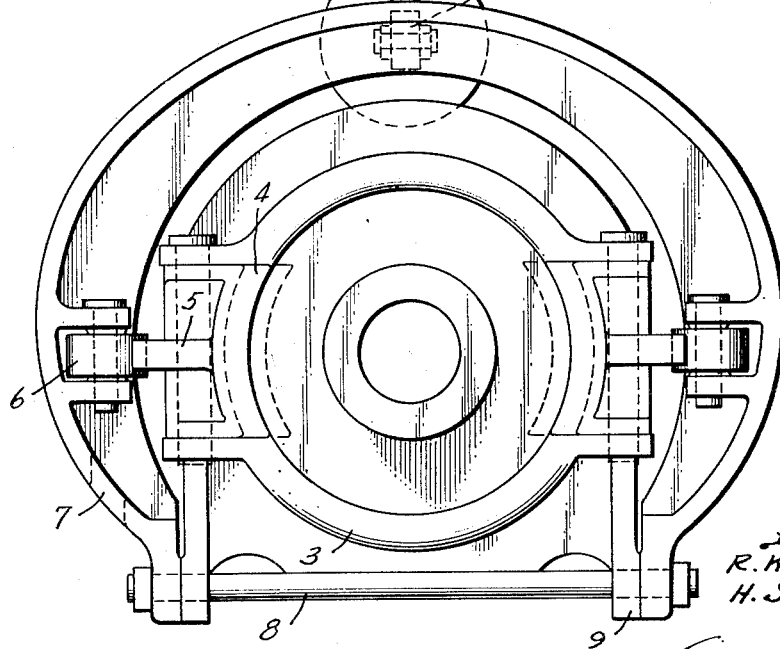

UNITED STATES PATENT OFFICE 2,658,445

ARRANGEMENT IN A SCREW PRESS FOR SQUEEZING OUT WATER

Rolf Karl Engelbrekt Wilén and Henrik Sixtus Wiklund, Helsingfors, Finland

Application October 23, 1950, Serial No. 191,545

2 Claims. (Cl. 100—50)

In screw presses designed to force water from rind, turf or the like, it has been customary to provide a means for restricting the passage of material at the discharge end of the device. Usually, this means comprises a cone or ball shaped plug fitted into the outlet which is either advanced into or retracted from the free outlet to vary the pressure within the screw press. The outlet tube may, also, be provided with regulating valves which perform the above mentioned function of controlling the pressure. The adjustment of these valves is usually done manually or may be automatically accomplished by means of counterweights, springs, or similar counterbalancing devices.

When a rind, for instance, is pressed, the necessary power or pressure when a constant outlet area is used, varies within wide ranges depending upon the consistency of the material pressed which may vary within wide limits. Some of the factors which materially affect the pressure are the age and/or the specific variety of tree from which the rind is taken, the proportion of gum present in the rind, and the humidity of the environment. To secure an economical operation the highest possible pressure should be used so as to extract the greatest amount of moisture from the material. In order to secure the best operation it is an object of the invention to secure an automatic regulation of the pressure necessary to hold the power required within certain given limits dependent upon the momentary consistency of the material being pressed.

A further object of the invention is to provide an arrangement whereby the disadvantages in previous devices are eliminated and the regulating valves are controlled by means of an hydraulic arrangement under the control of a regulator controlled in turn by the load upon the driving motor.

With the above and other objects in view which will become apparent from the detailed description below the invention is shown in the drawings in which:

Fig. 1 is a partial side view with parts in section showing the outlet of a screw press.

Fig. 2 is a front view of the construction shown in Fig. 1.

Fig. 3 is a partial horizontal view with a regulating flap and control therefor shown in section and, Fig. 4 is a side view of the entire screw press showing diagrammatically the various controls for regulating the outlet of the press.

In the various figures wherein like reference characters are used for like parts, 1 shows the outer mantle of the press and 2 the hollow screw axle. At the outlet end of the mantle there is secured thereto a tube 3 having diametrically opposed openings (not numbered) on the sides thereof. Two diametrically located flaps 4 pivotally mounted on posts 4a are located adjacent said openings and are designed to act as closure valves therefor. Each flap is supplied with a cam surface 5 with which a roller 6 cooperates. The pulleys 6 are rotatably mounted on a clamp 7 which in turn is pivoted upon the shaft 8 as particularly shown in Fig. 2. When the clamp 7 is pivoted around the shaft 8 in a counterclockwise direction in Fig. 1, the rollers 6 will cooperate with the cam surfaces 5 provided upon the flaps 4 and due to the curvature of such surfaces will nearly close both flaps. When the pressure of the pump builds up beyond the permissible limit then the clamp 7 is pivoted so as to open the flaps 4 and thereby relieve the pressure in the screw press.

The continuous momentary regulation of the flaps is secured by the construction shown in Fig. 4 which shows the driving motor 10 for the screw press. A hydraulic cylinder 11 shown in cross-section in Fig. 1 has a piston 12 fixed to a piston rod which carries at its end a roller 13 for coaction with the end of the clamp 7 opposite to that at which the clamp 7 is pivoted. A pressure pump 15 draws oil from a tank 16 and forces it under pressure into the cylinder 11. The pump delivers a constant amount of oil whose pressure and quantity for the cylinder 11 is regulated by a regulator 17 of known construction which in turn is controlled by the load upon the motor 10. Any variations therefore in the motor load will be communicated to the regulator 17 which will in turn regulate the position of the piston 12 in the cylinder 11 and thereby the position of the flaps 4. Oil is conducted through a shunt pipe 18 back to the tank 16.

In operation when the pressure of the material is momentarily increased, the load on the press motor 10 is also increased. When this occurs, the regulator 17 directly controlled by the press motor 10 activates the pump 15 which forces oil from the tank 16 through the pipe as indicated by arrows into the cylinder 11. The piston 12 in the cylinder 11 is consequently moved outwardly and forces the clamp 7, against the action of the spring, outwardly thereby through rollers 6 coacting with cam surfaces 5 allowing the flaps 4 to open to relieve the pressure in the press and consequently the motor load returns to normal, subsequent to which the spring-biased clamp returns the flaps to a normal position.

We claim:

1. In a draining screwpress having an outlet opening, a plurality of pivotally mounted flaps for coaction with said outlet opening, said flaps each having a curved cam surface thereon, a pivotally mounted clamp, pressure pulleys rotatably connected to said clamp in proximity to said cam surfaces on said flaps for coaction therewith, a hydraulic cylinder having a piston therein and a piston rod extending outwardly from said cylinder, said rod operatively contacting said clamp for movement thereof around its pivot, a source of oil, an oil conduit extending from said source to said cylinder, a pump inserted in said conduit, a regulator, a press motor, said regulator being electrically connected directly with said press motor and actuatable thereby for operating said pump contingent on load on said press motor whereby upon an increased load on said press motor the pump is actuated through the regulator for moving by oil pressure in the cylinder the clamp releasing pressure on the flaps which are thereby opened by pressure of pulp in the press for relieving the motor load.

2. In a draining screwpress having an outlet opening, a plurality of pivotally mounted flaps for coaction with said outlet opening, said flaps each having a curved cam surface thereon, a pivotally mounted clamp, pressure pulleys rotatably connected to said clamp in proximity to said cam surfaces on said flaps for coaction therewith, a hydraulic cylinder having a piston therein and a piston rod extending outwardly from said cylinder, said rod operatively contacting said clamp for movement thereof around its pivot, a press motor, a regulator controlled by the load upon said press motor, a hydraulic pump connected to said cylinder controlled by said regulator whereby upon an increase of the load on said press motor said pump is actuated through said regulator for actuating by hydraulic pressure the piston in said cylinder to release pressure on said flaps which are thereby opened due to the pressure of material in the press thus relieving the motor load.

ROLF KARL ENGELBREKT WILÉN.
HENRIK SIXTUS WIKLUND.

References Cited in the file of this patent

UNITED STATES PATENTS

| Number | Name | Date |
|---|---|---|
| 1,828,968 | Hiller et al. | Oct. 27, 1931 |
| 2,246,045 | Hirschberg | June 17, 1941 |
| 2,556,499 | Kilip | June 12, 1951 |

FOREIGN PATENTS

| Number | Country | Date |
|---|---|---|
| 10,178 | France | Mar. 2, 1909 |
| 554,916 | Germany | July 13, 1932 |
| 864,166 | France | Jan. 13, 1941 |